United States Patent
Vaillant et al.

(10) Patent No.: US 6,549,606 B1
(45) Date of Patent: Apr. 15, 2003

(54) METHOD OF RECONSTRUCTION OF A SECTION OF AN ELEMENT OF INTEREST

(75) Inventors: Régis Vaillant, Villebon sur Yvette (FR); Francisco Sureda, Chatenay Malabry (FR); Jean Lienard, Clamart (FR); Laurent Launay, St Remy les Chevreuse (FR)

(73) Assignee: GE Medical Systems, SA, Buc (FR)

( * ) Notice: Subject to any disclaimer, the term of this patent is extended or adjusted under 35 U.S.C. 154(b) by 203 days.

(21) Appl. No.: 09/666,999

(22) Filed: Sep. 21, 2000

(30) Foreign Application Priority Data

Sep. 24, 1999 (FR) ............................................. 99 11961

(51) Int. Cl.$^7$ ................................................. A61B 6/03
(52) U.S. Cl. .............................. 378/4; 378/15; 378/21; 378/901
(58) Field of Search ............................... 378/4, 15, 21, 378/62, 18, 901

(56) References Cited

U.S. PATENT DOCUMENTS

| | | | |
|---|---|---|---|
| 5,150,292 A | 9/1992 | Hoffmann et al. | |
| 5,204,627 A | 4/1993 | Mistretta et al. | ............. 324/309 |
| 5,241,471 A | 8/1993 | Trousset et al. | |
| 5,757,877 A | 5/1998 | Wilting | ............ 378/8 |
| 6,047,080 A | * 4/2000 | Chen et al. | .................. 382/128 |
| 6,320,928 B1 | 11/2001 | Vaillant et al. | ................. 378/4 |

FOREIGN PATENT DOCUMENTS

| | | |
|---|---|---|
| FR | 8903606 | 9/1990 |
| FR | 8916906 | 6/1991 |
| FR | 2752975 | 3/1998 |
| WO | WO49065 | 12/1997 |
| WO | WO 97/49065 | * 12/1997 |

OTHER PUBLICATIONS

Finet et al, "Parameters that Influence Accuracy and Precision of Quantitative Coronary Arteriography", Intl. Journal of Cardiac Imaging, vol. 12, pp 271–287, 1996.
Deriche et al; "Tracking Line Segments", Image and Vision Computing, vol. 8, No. 4 pp 261–270 Nov. 1990.
Gordon et al, "Algebraic Reconstruction Techniques (ART) for Three–Dimensional Electron Microscopy and X–Ray Photography", J. Theor. Biol, vol. 29 pp 471–481 1970.
U.S. patent application Ser. No. 09/667,067, filed Sep. 21, 2000, Inventor: Vaillant et al Title: Process for Reconstructing a Tridimensional Image of a Moving Object.

* cited by examiner

*Primary Examiner*—David V. Bruce
(74) *Attorney, Agent, or Firm*—Jay L. Chaskin

(57) ABSTRACT

Several acquisitions of digital radiographic images of an element of interest are made, by using a moving camera rotating around the element of interest in a plane parallel to the plane of a section, a matching stage is carried out in which projected elements are located in all the acquired images, corresponding respectively to the projections of the element of interest in those acquired images. The width of each projected element is determined and the section of the element of interest is reconstructed from the different widths determined.

13 Claims, 1 Drawing Sheet

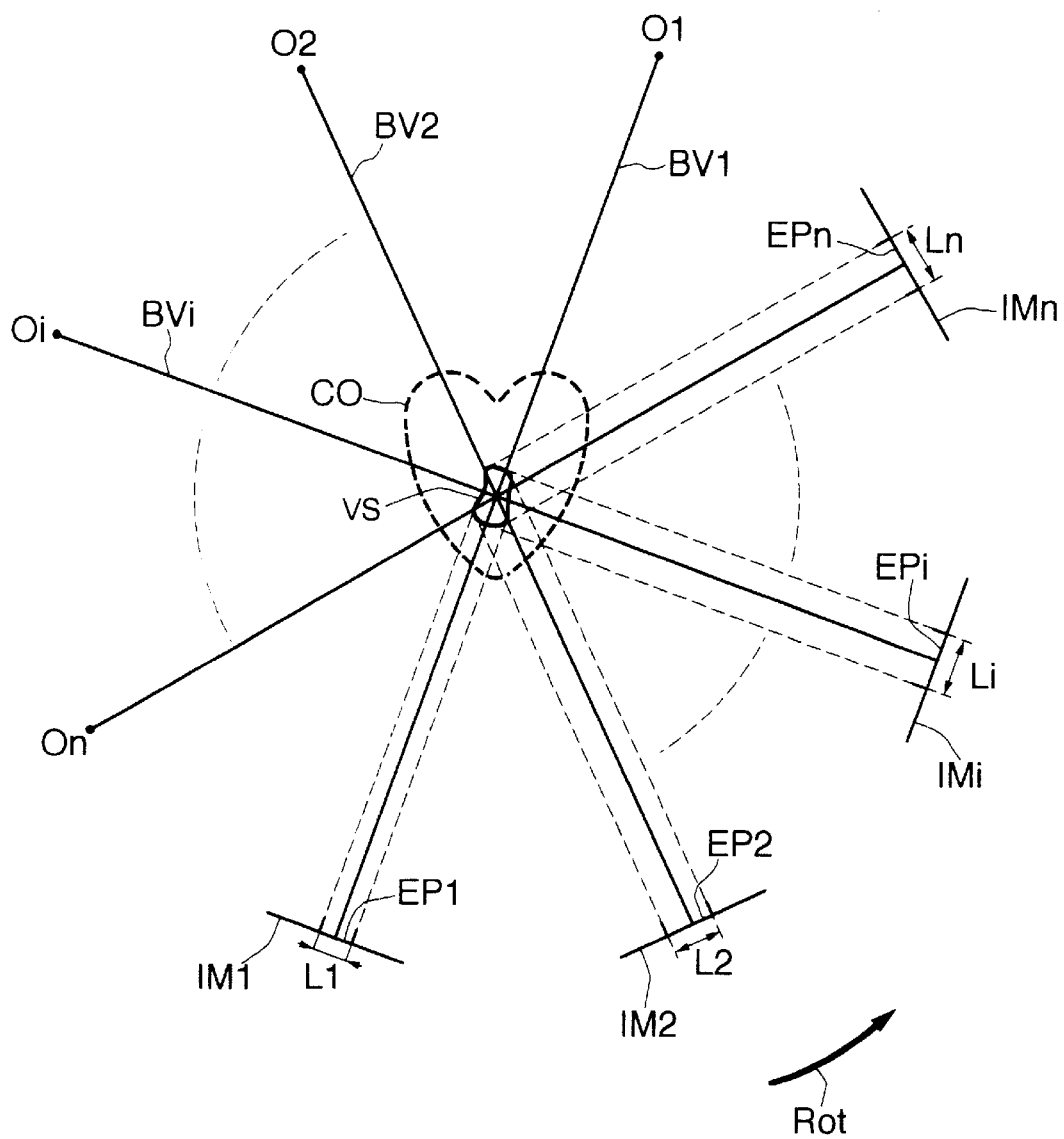

METHOD OF RECONSTRUCTION OF A SECTION OF AN ELEMENT OF INTEREST

BACKGROUND OF THE INVENTION

The invention concerns the reconstruction of a section, such as a cross section, of an element of interest contained in an object, notably, in motion.

The invention has an especially important application in the medical field, in which reconstruction is undertaken of the internal structures of patients under examination and, in particular, the reconstruction of images of vessels of the heart.

The invention can, nevertheless, be applicable in other fields, notably, in industrial nondestructive control, in which examinations of the same type as medical examinations are performed.

In the medical field, a correct understanding of pathology, like, for example, the observation of stenosis in a coronary artery from X-ray images, is a particularly difficult task. In fact, the X-ray images are projected two-dimensional images. Consequently, interpretation of the images is particularly difficult.

BRIEF DESCRIPTION OF THE INVENTION

The invention is aimed at providing a solution to this problem and proposes a method of reconstruction of a section, such as a cross section of an element of interest, like a portion of a vessel contained in an object, in which method several acquisitions of digital radiographic images of the element of interest are made, by using a moving camera rotating around the element of interest in a plane parallel to the plane of the section, for example, a plane perpendicular to the element of interest. A matching stage is carried out in which projected elements are located in all the acquired images, corresponding respectively to the projections of the element of interest in those acquired images.

The width of each projected element is determined and the section of the element of interest is reconstructed from the different widths determined.

The spatial orientation of the element of interest is advantageously determined from a prior reconstruction of a three-dimensional representation of the object, using, for example, an algebraic iterative algorithm of image reconstruction.

The principle of such an algebraic iterative algorithm of image reconstruction is well known to one skilled in the art and has already been the subject of considerable literature. One can mention, notably, the article by Gordon, Bender and Herman entitled "Algebraic reconstruction technique for tridimensional electron microscopy and X-ray photography," *Journal of Theol. Biol.* 29, pages 9471 to 781 (1970), or also French Patent Applications Nos. 89 03606 or 89 16906.

The method of reconstruction of a three-dimensional image of an object as described in French Patent Application No. 2,752,975 can also be used.

One skilled in the art may refer to these documents of the prior art for more information concerning the method of use of the image reconstruction algorithm and/or the phase of calibration of the camera.

When the object is in motion, for example, when the heart is involved, a technique of four-dimensional reconstruction of an image of an object in motion can also be advantageously used, as described in U.S. patent application Ser. No. 09/667,067 filed in the name of Vaillant et al. on Sep. 9, 2000, entitled "Process for Reconstructing a Tridimensional Image of an Object", and assigned to assignee of the present application.

BRIEF DESCRIPTION OF THE DRAWING

Other advantages and characteristics of the invention will appear on examination of the detailed description of a nonlimitative method of use and of the attached drawing, in which the single FIGURE very schematically illustrates a method of use of the technique.

DETAILED DESCRIPTION OF THE INVENTION

Although the invention is not limited thereto, the application of the method will be described for the reconstruction of the cross section of a vessel VS of a patient's heart CO.

In the FIGURE, the references BVi (i=1 to n) designates different images acquired by rotation Rot around the patient of an X-ray source (not represented here for sake of simplification). The plane of the FIGURE is at right angles to the axis of the portion of the vessel VS considered. The X-rays are parallel to that plane of rotation and therefore perpendicular to the vessel VS. Each image is then situated in a plane at right angles to the plane of rotation.

Each acquired initial image IMi is obtained from a two-dimensional radiation detector, for example, of the luminance amplifier type used in radiology, placed opposite the X-ray tube in a plane of projection.

In the case of an X-ray imaging system composed of an X-ray source and a two-dimensional detector, the geometric operation entering into production of the acquired image is a conical projection of a scanned object, deployed in a three-dimensional space, on a two-dimensional space which is that of the plane of projection corresponding to the plane of detection. The calibration of an imaging system, that is, the operation resulting in the precise indirect knowledge of the geometric parameters entering into the production of an image, is standard and well known to one skilled in the art.

The spatial orientation of the vessel making it possible to define the plane of rotation of the camera was determined by a three-dimensional prior reconstruction of the heart and, in particular, of the vessels of the heart. This three-dimensional representation was, for example, also obtained from two-dimensional projected images and from an algebraic iterative algorithm of reconstruction of images, such as those previously mentioned.

Once the images IM1 to IMn have been acquired from the points of sight O1 to On, a matching stage is carried out, in which the projections EPi of the vessel VS considered are located in all the acquired images IMi. Such a matching technique is standard for one skilled in the art.

Such matching techniques are, for example, described in the article by R. Deriche and O. Fangeras entitled "Tracking line segments," *Image and Vision Computing*, Vol. 8, No. 4, November 1990, pages 261–270. One skilled in the art may possibly refer to it.

Another characteristic of the method according to the invention consists of determining the width Li of each projected element EPi from, notably, an algorithmic segmentation technique, such as that described in the article by G. Finet and J. Lienard entitled "Parameters that influence accuracy and precision of quantitative coronary arteriography," *The International Journal of Cardiac Imaging*, Vol. 12, No. 4, December 1996, pages 271–287, and to which one skilled in the art may possibly refer.

The cross section of the element of interest is then reconstructed from the different predetermined widths by using, for example, standard geometric techniques of cone intersection, taking into account the geometric parameters entering into the production of images.

From a material standpoint, in addition to the standard camera, a computer is provided, equipped with a screen and incorporating the different software means of the invention, notably, the matching, segmentation and reconstruction algorithms.

The invention is not limited to the reconstruction of a cross section of an element of interest, but also applies to the reconstruction of any section from a rotation of the camera in a plane of rotation parallel to the plane of said section.

Various modifications in structure and/or steps and/or function may be made by one skilled in the art without departing from the scope of the invention.

What is claimed is:

1. A method of reconstruction of a cross section of an element of interest contained in an object, comprising the steps of:
    (a) acquiring several digital radiographic images of the element of interest by using a moving camera rotating around the element of interest in a plane parallel to the plane of the section;
    (b) matching projected elements which are located in all the acquired images, corresponding respectively to projections of the element of interest in those acquired images;
    (c) determining a width of each projected element;
    (d) reconstructing the section of the element of interest from the different widths determined; and
    (e) determining a spatial orientation of the element of interest from a reconstruction of a three-dimensional representation.

2. The method of claim 1 wherein the step of spatial orientation is determined by an algebraic iterative algorithm of image reconstruction.

3. The method of claim 1 wherein the step of determining the width of each projected element is determined by an algorithmic segmentation technique.

4. The method of claim 1 wherein the step of reconstructing is determined by the cross-section of the element of interest by applying geometric techniques of cone intersection and geometric parameters for producing the image.

5. A method of reconstruction of a cross-section of an element of interest contained in an object comprising the steps of:
    (a) acquiring several images of the element of interest in a plane parallel to the plane of the section;
    (b) matching projected elements that are located in all the acquired images;
    (c) determining a width of each projected element; and
    (d) reconstructing the cross-section of the element of interest from the different widths determined.

6. The method of claim 5 comprising:
    (e) determining a spatial orientation of the element of interest from a reconstruction of a three-dimensional representation.

7. The method of claim 5 wherein the step of spatial orientation is determined by an algebraic iterative algorithm of image reconstruction.

8. The method of claim 5 wherein the step of determining the width of each projected element is determined by an algorithmic segmentation technique.

9. The method of claim 5 wherein the step of reconstructing is determined by a cross-section of the element of interest by applying geometric techniques of cone intersection and geometric parameters for producing the image.

10. A radiology apparatus comprising:
    (a) means for providing a source of radiation;
    (b) means for detecting the radiation after the radiation is applied to an element of interest in an object;
    (c) means for acquiring images of the element of interest after the radiation is applied;
    (d) means for matching projected elements that are located in all the acquired images, corresponding respectively to projections of the element of interest in those acquired images;
    (e) means for determining a width of each projected element;
    (f) means for reconstructing a cross-section of the element of interest from different widths determined; and
    (g) means for determining a spatial orientation of the element of interest from a reconstruction of a three-dimensional representation.

11. The apparatus of claim 10 wherein the means for spatial orientation is determined by an algebraic iterative algorithm of image reconstruction.

12. The apparatus of claim 10 wherein the means for determining the width of each projected element is determined by an algorithmic segmentation technique.

13. The apparatus of claim 10 wherein the means for reconstructing is determined by a cross-section of the element of interest by applying geometric techniques of cone intersection and geometric parameters for producing the image.

* * * * *